Aug. 21, 1951  R. L. BOYER  2,565,198
TURBO-SUPERCHARGED HIGH COMPRESSION ENGINE
HAVING LOW FUEL-AIR RATIO PRODUCING
LOW TURBINE INLET TEMPERATURE
Filed April 8, 1949
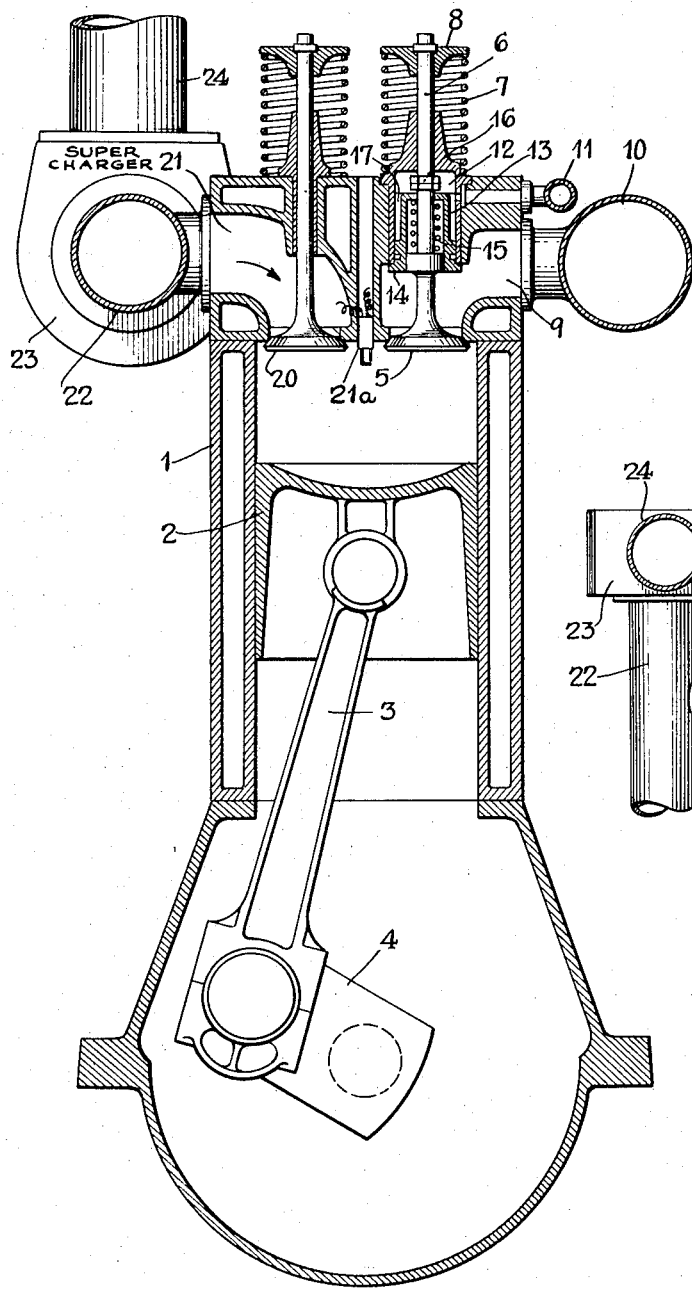
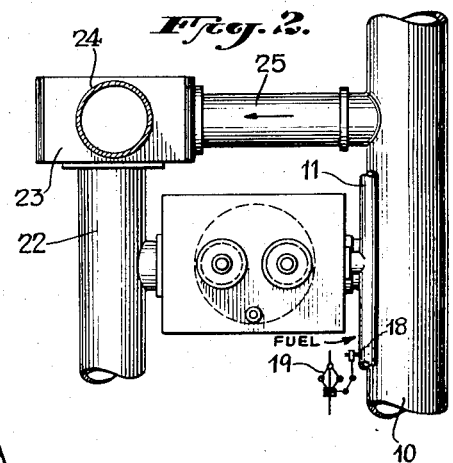
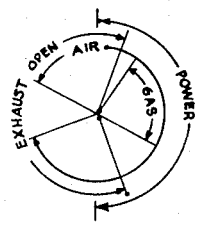
INVENTOR.
RALPH L. BOYER.
BY
ATTORNEYS.

Patented Aug. 21, 1951

2,565,198

UNITED STATES PATENT OFFICE 2,565,198

TURBO-SUPERCHARGED HIGH COMPRESSION ENGINE HAVING LOW FUEL-AIR RATIO PRODUCING LOW TURBINE INLET TEMPERATURE

Ralph L. Boyer, Mount Vernon, Ohio, assignor to Cooper-Bessemer Corporation, Mount Vernon, Ohio, a corporation of Ohio Application April 8, 1949, Serial No. 86,134

2 Claims. (Cl. 60—13)

The invention relates to four cycle engines powered by gaseous fuels of which natural gas is the most commonly used example, the invention being also useful with other gaseous fuels which behave similarly in engines, such as manufactured and by-product gas, sewer gas, refinery gases of various types.

As referred to in the U. S. Patent No. 2,375,071 issued to me on May 1, 1945, it has been heretofore proposed to supercharge engines powered by permanent gaseous fuels of the character above mentioned, but in so far as I am aware supercharged engines of the above character have not previously been put into practical use. Heretofore the supercharging of Diesel engines by the use of exhaust driven turbo-charges has been found to be satisfactory from the practical standpoint, but in engines powered by permanent gas fuels the exhaust temperatures have been so high as to make it impractical to supply compressed air for supercharging in this way, and in many installations it is too expensive and otherwise impractical to supply air under pressure for supercharging by the use of other available methods or apparatus. Furthermore in many installations it is not economical to ignite a high compression gas engine by injecting a pilot charge of oil into the highly compressed gaseous mixture, and spark ignition has been considered as unsatisfactory for gas fueled engines operating under high compression conditions. The present invention aims primarily to provide a supercharged, high compression engine powered by permanent gas fuels as above referred to, wherein supercharging by an exhaust driven turbo-charger will be practical and satisfactory, and wherein spark ignition is satisfactorily provided for, the engine showing a brake thermal efficiency of 40% or better as compared to about 25% for spark-ignited gas fueled engines now in use.

I have found that the objects of the invention may be achieved by the use of a combination of features as hereinafter described. In the first place the engine is arranged to feed into the cylinder a gas and air mixture which is much leaner than has heretofore been the practice. Speaking in terms of natural gas, the conventional prior practice has been to provide a mixture of approximately one part of gas to ten parts of air by volume, which approximates a perfect mixture, whereas in carrying out the present invention the mixture ratio is preferably about 1 to 20 at full load, although a ratio down to about 1 to 14 at full load may be employed without incurring preignition difficulties. This substantially leaner fuel mixture becomes possible primarily because of the greatly improved fuel economy as later referred to in more detail. Under light load conditions the air may be throttled somewhat to maintain a better fuel economy, but this is not so at full load, the mixture always being substantially leaner as compared to prior accepted practice, and the governing being primarily by control of the gas supplied. The gas and air admission mechanism must produce a substantially homogeneous mixture in the cylinder under the above operating conditions, otherwise any zone which is relatively rich in gas will be prone to cause preignition. Using a lean mixture of the character above described, it is found that the engine will run up to a substantial overload before preignition or detonation begins to occur.

The engine utilizes an exhaust gas driven supercharger as hereinafter referred to, to produce a compression pressure upon a mixture of the character above described, which runs between about 350 to 450 lbs. per sq. in. at light load, and as the load increases the compression pressure builds up, due to the increase in the supercharging effect, until at full load the compression pressure is in the neighborhood of 600 lbs. per sq. in. The use of such a supercharger becomes practical under the above operating conditions, since it is found that the resulting exhaust gas temperatures are low enough to permit such a supercharger to be used without overheating and unduly shortening the life of the equipment. Heretofore, as above stated, it has not been practical to use exhaust gas driven superchargers in connection with gas fueled engines and accordingly they have not been so used, but in the case of an engine as above described, the temperature of the exhaust gases entering the turbine of the turbo-charger may be readily kept at about 1000° F. or under, which is satisfactory for the use of an exhaust gas driven supercharger, in contrast to higher temperatures of the order of 1300° to 1400° F. which would be unduly high. Also the cooling equipment required for such an engine will be no more than about one-half as large as has been required for present day gas fueled engines of the usual type.

Spark ignition in gas fueled engines operating under the high compression pressure above described, has always been regarded as being impractical but I have found that it may be satisfactorily achieved providing a voltage be employed which is markedly higher than has heretofore been the practice, of course with appropriate precautions in respect to insulation; for example with a normal spark plug gap the previously accepted practice has been to use a voltage ranging up to about 15,000 volts, whereas in practicing the present invention a voltage of the order of 30,000 to 50,000 volts should be used. The practical and satisfactory utilization of spark ignition in an engine of the above character, is highly important in many installations from the viewpoint of economy, since the gaseous fuel is frequently available at low cost, for installations where the cost of pilot oil injected for ignition purposes to operate the engine as a gas Diesel, would render the operating costs unduly high. Furthermore, an engine operating in accordance with the present invention markedly increases the power that can be obtained with given displacement, foundations, etc., as compared to current spark ignited gas engines; for example as compared to a modern four cycle, spark ignited gas engine of usual type and rated at 70 B. M. E. P., the rating would be about 120 B. M. E. P. for the present engine. In the drawing—

Fig. 1 is a central longitudinal section through the cylinder of an engine constructed to operate in accordance with the invention, and having an exhaust gas driven supercharger associated therewith.

Fig. 2 is a plan view on reduced scale, of the parts shown in Fig. 1.

Fig. 3 is a schematic diagram showing approximate valve timings at full load which may be used in practicing the invention.

The invention is illustrated as applied to a four cycle engine powered by gaseous fuel of the type above described, and having a cylinder 1 within which operates in the usual manner a piston 2 connected by a connecting rod 3 to a crankshaft 4. A main admission valve 5, having a stem 6, and which is urged toward seated position by a spring 7 engaging against a collar 8 at the upper end of the valve stem, controls the admission from a chamber 9 which is connected to the air supply conduit 10. As later described in more detail, the air supply conduit 10 receives air under pressure from a supercharger, and valve 5 is timed to open and close as hereinafter described, by appropriate actuating mechanism (not illustrated). The gaseous fuel is supplied under pressure from a supply line 11, with which a chamber 12 surrounding the valve stem 6, is in communication. An annular gas valve 13 surrounding the valve stem 6, controls communication between the chambers 12 and 9, and when the main valve 5 is in closed position, the head 14 of the gas valve is urged into positive engagement with its seat by a spring 15, thus sealing the gas effectively against admission into chamber 9. Shortly after valve 5 starts to open, a collar 16 on the valve stem 6 engages the valve member 13 to move the latter toward open position along with valve 5, but the gas does not flow into chamber 9 until longitudinal passageways 17 in valve member 13 have moved downwardly past the seat of valve head 14. The valve mechanism is timed so that the main admission valve 5 opens toward the end of the exhaust stroke and before the exhaust valve has closed, to admit air under pressure for scavenging purposes, communication between the chambers 12 and 9 being still closed at this stage by valve 13. Then after the exhaust valve has closed and during the early part of the admission stroke, the auxiliary gas valve 13 is opened as above described and then both valves remain open to admit a mixture of air and gaseous fuel under pressure. Then as main valve 5 moves toward closed position, the gas valve 13 first closes to shut off the supply of gaseous fuel, and a stream of air continues to pass through chamber 9 into the cylinder until valve 5 reaches its seated position. The valve mechanism serves to thoroughly mix the air and gas, to produce a substantially homogeneous mixture which may be compressed as heretofore set forth without encountering preignition objections.

Regulation of the engine may be secured as indicated schematically in Fig. 2 by a throttle valve 18 in the gas line, which is controlled by an appropriate governor 19.

The exhaust valve 20 may be of any usual or appropriate construction, and a spark plug 21a of the previously described high voltage type is shown as mounted in the cylinder between the valves 5 and 20. A supercharged, lean mixture of the character described is thus introduced into the cylinder, and as previously stated, the engine is constructed to produce at full load, a compression pressure of the order of 600 lbs. per sq. in. and it is found that the thus compressed charge may be satisfactorily ignited by spark ignition provided the voltage be markedly higher than has heretofore been the practice and provided the lean charge be substantially homogeneous.

The drawing shows the exhaust gases as being conducted through an exhaust gas passageway 21, which communicates with an exhaust gas conduit 22 leading to an exhaust gas driven supercharger indicated generally at 23, the air passing through the supercharger coming in through an intake conduit 24, and being delivered from the supercharger through a conduit 25 leading into the air intake conduit 10. The specific construction of the supercharger is not described in detail since appropriate forms thereof are known in the art, the important point being as previously stated that a gas fueled, spark ignited engine of the character above described produces an exhaust gas temperature low enough to make it practical to use such a supercharger, which has not been the case with such engines as previously constructed.

While the invention has been disclosed as carried out by an engine of the above described specific construction, it should be understood that changes may be made therein without departing from the invention in its broader aspects, within the scope of the appended claims.

I claim:

1. A high compression, supercharged, four cycle gas fueled engine of the character described, having valve mechanism constructed to introduce into the cylinder a mixture of air and gaseous fuel in which the fuel-air ratio is between about one-half to three-quarters of the fuel-air ratio of a chemically perfect fuel-air mixture, to prevent spontaneous ignition of the first mentioned air-fuel mixture when subjected to high compression pressure as hereinafter set forth, a supercharger of the exhaust gas driven type having its turbine connected to the exhaust conduit of the engine and also having its compressor connected to deliver air under pressure to said valve mechanism, a spark ignition device mounted in said cylinder, said engine and supercharger being constructed to produce in said cylinder a compression pressure at full load which is of the order of 600 p. s. i. whereby the temperature in the exhaust gases entering said supercharger turbine does not exceed about 1000° F.

2. The method of operating a four cycle gas fueled engine of the character described, which includes supercharging into the engine cylinder a substantially homogeneous mixture of air and gaseous fuel in which the fuel-air ratio is between about one-half to three-quarters of the fuel-air ratio of a chemically perfect fuel-air mixture, to prevent spontaneous ignition of the first mentioned air-fuel mixture when subjected to high compression pressure as hereinafter set forth, compressing said mixture to a compression pressure at full load, of the order of 600 p. s. i., firing said mixture by spark ignition at a voltage of the order of 30,000–50,000 volts, conducting exhaust gases from said engine to the turbine of a supercharger to enter the turbine at a temperature not exceeding about 1000° F., to power said supercharger, and conducting air supplied by the compressor of the supercharger under pressure into the engine as part of the aforesaid supercharged mixture.

RALPH L. BOYER.

REFERENCES CITED

The following references are of record in the file of this patent:

UNITED STATES PATENTS

| Number | Name | Date |
|---|---|---|
| 1,304,928 | Anderson | May 27, 1919 |
| 1,309,549 | Sherbondy | July 8, 1919 |
| 1,910,279 | Büchi | May 23, 1933 |